United States Patent
Kida et al.

(10) Patent No.: US 11,966,542 B2
(45) Date of Patent: Apr. 23, 2024

(54) TOUCH PANEL SYSTEM, DISPLAY DEVICE, AND METHOD FOR CONTROLLING TOUCH PANEL

(71) Applicant: Sharp Display Technology Corporation, Kameyama (JP)

(72) Inventors: Kazutoshi Kida, Kameyama (JP); Takenori Maruyama, Kameyama (JP)

(73) Assignee: Sharp Display Technology Corporation, Kameyama (JP)

(*) Notice: Subject to any disclaimer, the term of this patent is extended or adjusted under 35 U.S.C. 154(b) by 0 days.

(21) Appl. No.: 18/126,826

(22) Filed: Mar. 27, 2023

(65) Prior Publication Data

US 2023/0315232 A1  Oct. 5, 2023

(30) Foreign Application Priority Data

Mar. 31, 2022  (JP) .................. 2022-060998

(51) Int. Cl.
*G06F 3/041*  (2006.01)
*G06F 3/044*  (2006.01)

(52) U.S. Cl.
CPC .......... *G06F 3/0418* (2013.01); *G06F 3/0445* (2019.05); *G06F 2203/04105* (2013.01)

(58) Field of Classification Search
None
See application file for complete search history.

(56) References Cited

U.S. PATENT DOCUMENTS

| | | | |
|---|---|---|---|
| 2015/0060255 A1* | 3/2015 | Chen ................ | H03K 17/9622 200/5 R |
| 2019/0018534 A1* | 1/2019 | Holman ............... | G06F 3/014 |
| 2022/0269319 A1* | 8/2022 | Lee .................... | H01Q 1/2266 |
| 2023/0081114 A1* | 3/2023 | Ide .................... | G06F 3/0446 73/780 |

FOREIGN PATENT DOCUMENTS

| | | | | |
|---|---|---|---|---|
| JP | 2012-043394 A | 3/2012 | | |
| JP | 2015-075892 A | 4/2015 | | |
| JP | 2017-049659 A | 3/2017 | | |
| WO | WO-2019208022 A1 * | 10/2019 | ............. | H01Q 1/243 |
| WO | WO-2020028880 A1 * | 2/2020 | ........... | G06F 3/0412 |

* cited by examiner

*Primary Examiner* — Duane N Taylor, Jr.
(74) *Attorney, Agent, or Firm* — ScienBiziP, P.C.

(57) ABSTRACT

A touch panel system includes a capacitive touch panel and a controller that controls the touch panel. The touch panel includes drive electrodes and floating island electrodes located on a first substrate and position detection electrodes, pressure detection electrodes, and heat detection electrodes located on a second substrate. The drive electrode overlaps at least part of the heat detection electrode and at least part of the pressure detection electrode, and the floating island electrode overlaps at least part of the position detection electrode in plan view. The controller provides a drive signal to the drive electrodes and the heat detection electrodes and corrects a pressure detection signal obtained from each of the pressure detection electrodes by using a heat detection signal obtained from a change in a coupling capacitance between the pressure detection electrode and the heat detection electrode.

6 Claims, 10 Drawing Sheets

TOUCH PANEL SYSTEM, DISPLAY DEVICE, AND METHOD FOR CONTROLLING TOUCH PANEL

BACKGROUND

1. Field

The present disclosure relates to a touch panel system, a display device, and a method for controlling a touch panel.

2. Description of the Related Art

In recent years, touch panels have been widely used in smartphones, tablets, instrument panels of automobiles, and the like. Japanese Unexamined Patent Application Publication No. 2015-75892 describes a touch panel that detects the position of a pointer, such as a finger or a pen, and the pressure level on the touch panel.

The touch panel described in Japanese Unexamined Patent Application Publication No. 2015-75892 includes a pyroelectric body, and the touch panel detects the position the finger is getting closer to using the pyroelectric effect of the pyroelectric body and detects the pressure of the finger using the piezoelectric effect of the pyroelectric body. Therefore, even when a heat generating object other than a finger gets closer to the touch panel, the touch panel may erroneously detect the approach of the heat generating object as the approach of a finger. Conversely, if the temperatures of the pyroelectric body of the touch panel and the finger are almost the same, it is difficult to obtain the pyroelectric effect, which may make the touch panel difficult to detect the position of the finger.

The present disclosure provides a touch panel system, a display device, and a method for controlling a touch panel capable of detecting the position and pressure while reducing the influence of finger heat and ambient heat.

SUMMARY

According to an aspect of the present disclosure, a touch panel system includes a capacitive touch panel and a controller configured to control the touch panel. The touch panel includes a first substrate, a second substrate, a dielectric layer located between the first substrate and the second substrate, a plurality of drive electrodes located on the first substrate, a plurality of floating island electrodes located on the first substrate, a plurality of position detection electrodes located on the second substrate, a plurality of pressure detection electrodes located on the second substrate, and a plurality of heat detection electrodes located on the second substrate, where each of the heat detection electrodes is adjacent to one of the pressure detection electrodes. Each of the drive electrodes overlaps at least part of a corresponding one of the heat detection electrodes and at least part of a corresponding one of the pressure detection electrodes, and each of the floating island electrodes overlaps at least part of a corresponding one of the position detection electrodes in plan view. The controller provides a drive signal to the drive electrodes and the heat detection electrodes and corrects a pressure detection signal obtained from each of the pressure detection electrodes by using a heat detection signal obtained from a change in a coupling capacitance between the heat detection electrode adjacent to the pressure detection electrode and the pressure detection electrode.

According to another aspect of the present disclosure, a method for controlling a touch panel is provided. The touch panel is a capacitive touch panel. The touch panel includes a first substrate, a second substrate, a dielectric layer located between the first substrate and the second substrate, a plurality of drive electrodes located on the first substrate, a plurality of floating island electrodes located on the first substrate, a plurality of position detection electrodes located on the second substrate, a plurality of pressure detection electrodes located on the second substrate, and a plurality of heat detection electrodes located on the second substrate, where each of the heat detection electrodes is adjacent to one of the pressure detection electrodes. Each of the drive electrodes overlaps at least part of a corresponding one of the heat detection electrodes and at least part of a corresponding one of the pressure detection electrodes, and each of the floating island electrodes overlaps at least part of a corresponding one of the position detection electrodes in plan view. The method includes providing a drive signal to the drive electrodes and the heat detection electrodes and correcting a pressure detection signal obtained from each of the pressure detection electrodes by using a heat detection signal obtained from a change in a coupling capacitance between the heat detection electrode adjacent to the pressure detection electrode and the pressure detection electrode.

DESCRIPTION OF THE EMBODIMENTS

Figure 1:
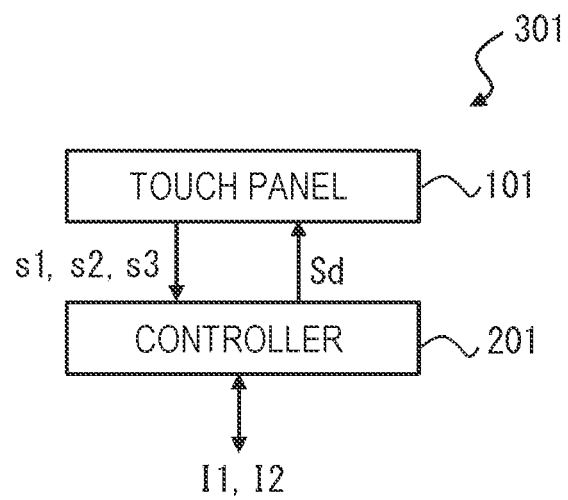
FIG. 1 is a block diagram of the configuration of a touch panel system according to a first embodiment.

Exemplary embodiments of the present disclosure are described below with reference to the accompanying drawings. The present disclosure is not limited to the embodiments described below, and design changes can be made as appropriate within the scope of satisfying the configuration of the present disclosure. Furthermore, in the following description, the same reference numerals in different drawings identify the same elements or elements having similar functions. In this case, description of the element may not be repeated. In addition, the configurations described in the embodiment and other embodiments may be appropriately combined or changed without departing from the scope of the present disclosure. For ease of understanding, in the drawings cited below, the configuration may be illustrated in a simplified or schematic form, or some constituent members may be omitted. The dimensional ratios between the constituent members illustrated in the drawings do not necessarily indicate the actual dimensional ratios. The term "row direction" refers to the horizontal direction (the x direction) of the screen of the display device, and the term "column direction" refers to the vertical direction (the y direction) of the screen of the display device. In addition, in the drawings cited below, a variety of electrodes are indicated with hatching to make them easier to identify.

First Embodiment

FIG. 1 is a block diagram of the configuration of a touch panel system 301 according to the first embodiment. The touch panel system 301 includes a touch panel 101 and a controller 201. The touch panel 101 is configured as a capacitive touch panel. More specifically, the touch panel 101 is configured to receive a drive signal Sd from the controller 201 and output a signal s1 indicating a capacitance change related to the position of a pointer, a signal s2 indicating a capacitance change related to the pressure applied by the pointer, and a signal s3 indicating a capacitance change due to heat.

The controller 201 provides the drive signal Sd and a drive signal Dh to the touch panel 101 and corrects a pressure detection signal by using a heat detection signal. In addition, the controller 201 outputs position information I1 and pressure information I2 from the position detection signal and the corrected pressure detection signal, respectively.

Figure 2:
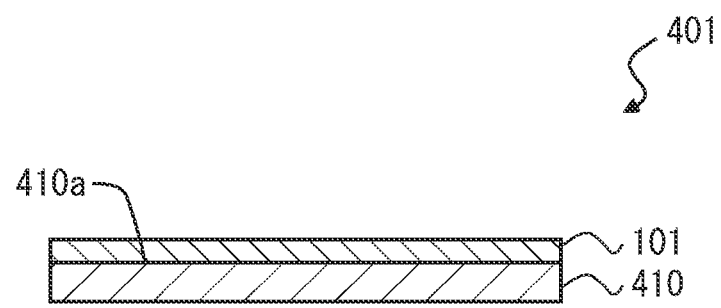
FIG. 2 is a schematic cross-sectional view of the configuration of a display device including the touch panel system.

FIG. 2 is a schematic cross-sectional view of the configuration of a display device 401 including the touch panel system 301. The display device 401 includes the touch panel system 301 and a display 410. The display 410 displays an image on a display surface 410a. The touch panel 101 of the touch panel system 301 is disposed on the display surface 410a. The display 410 is, for example, a liquid crystal display or an organic electroluminescence (EL) display.

An operator touches a specific position on the surface of touch panel 101 with a pointer, such as a finger or a stylus pen, in accordance with information displayed on the display surface 410a. The touch panel system 301 detects the touch position and the pressure level and outputs position information and pressure information. The output information is input to a control device, such as a microcomputer, that controls a smartphone, a mobile terminal, or a car navigation system including the display device 401 and is used to control an image displayed by the display device 401 and control these devices. As described in detail below, the touch panel system 301 according to the present embodiment reduces the occurrence of erroneous detection by reducing the influence of heat due to the temperature of the use environment of the touch panel 101 or the temperature difference between the use environment and the pointer. The configuration of the touch panel system 301 and the operation performed by the touch panel system 301 are described in detail below.

Structure of Touch Panel

Figure 3:
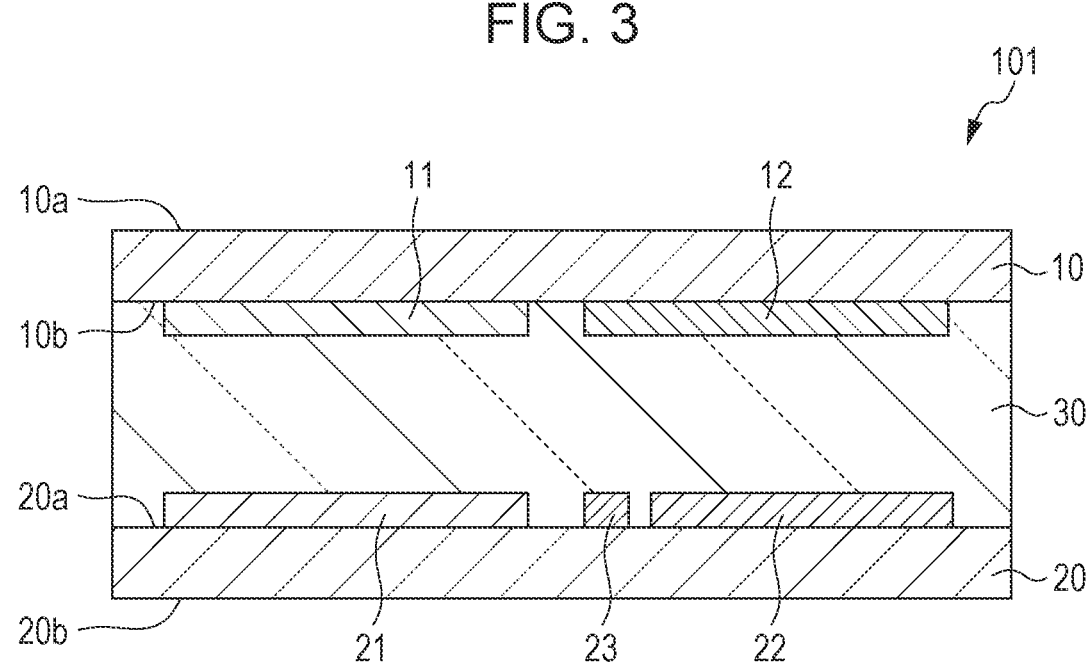
FIG. 3 is a schematic illustration of the cross-sectional structure of a touch panel.
Figure 4:
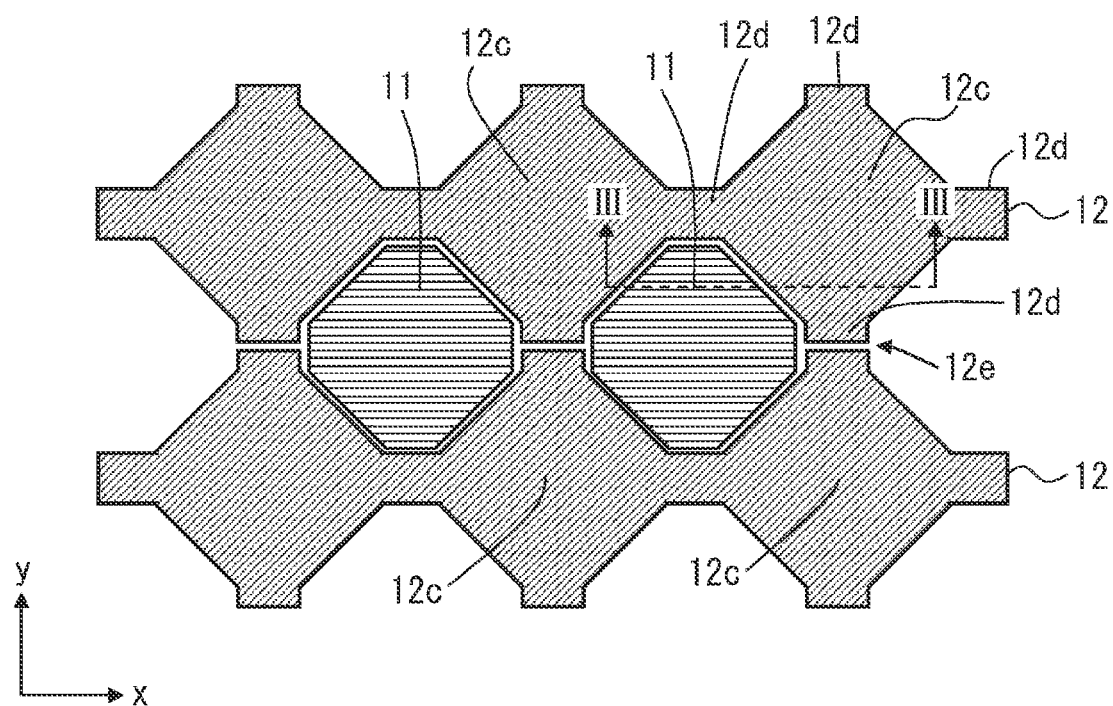
FIG. 4 is a plan view of the structure of electrodes included in the touch panel.
Figure 5:
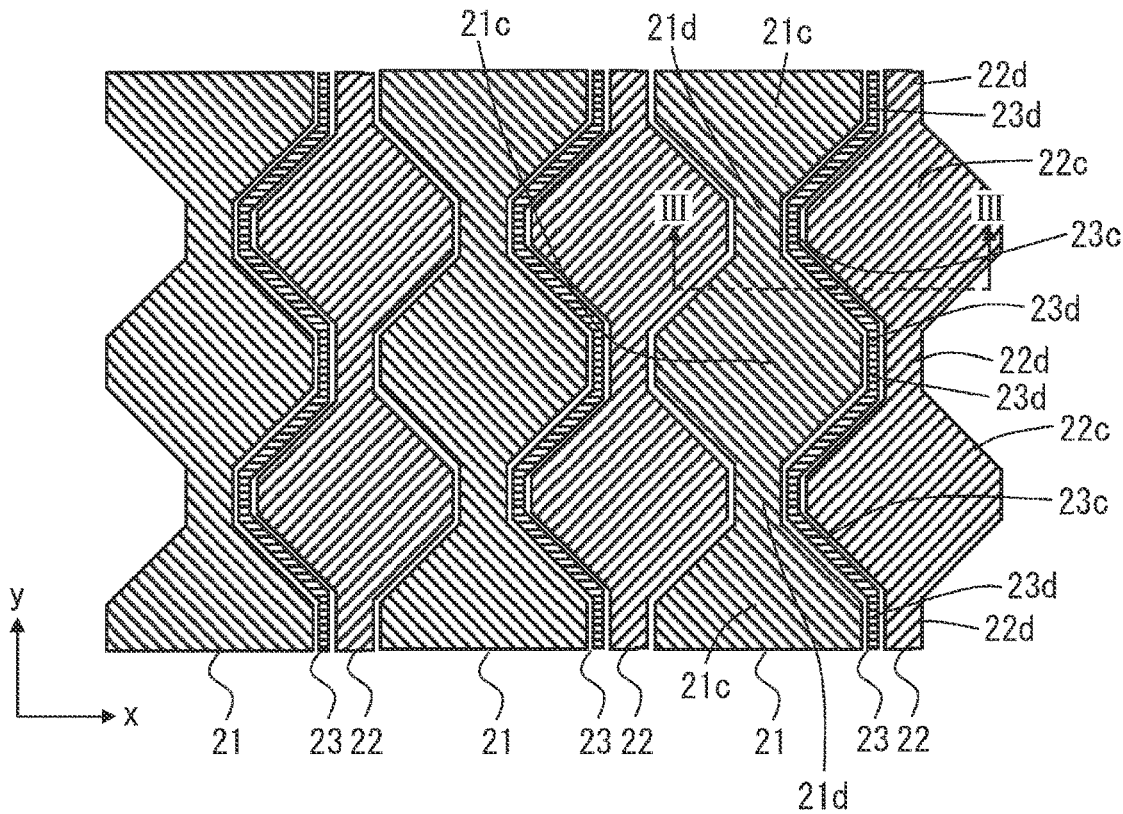
FIG. 5 is a plan view of the structure of the electrodes included in the touch panel.

FIG. 3 is a schematic illustration of an enlarged cross-sectional structure of the touch panel 101. FIGS. 4 and 5 are plan views of the structure of electrodes included in the touch panel 101. The position of the cross section illustrated in FIG. 3 is indicated by a line in FIGS. 4 and 5.

The touch panel 101 includes a first substrate 10, a second substrate 20, a dielectric layer 30, a plurality of drive electrodes 12, a plurality of floating island electrodes 11, a plurality of position detection electrodes 21, a plurality of pressure detection electrodes 22, and a plurality of heat detection electrodes 23.

The first substrate 10 has a thin plate shape having a first principal surface 10a and a second principal surface 10b opposite to the first principal surface 10a. Similarly, the second substrate 20 has a thin plate shape having a first principal surface 20a and a second principal surface 20b opposite to the first principal surface 20a. The first substrate 10 and the second substrate 20 are disposed such that the second principal surface 10b of first substrate 10 faces the first principal surface 20a of second substrate 20.

The first substrate 10 and the second substrate 20 are made of transparent materials, such as glass or a polyethylene terephthalate (PET) film.

The dielectric layer 30 is located between the first substrate 10 and the second substrate 20. The dielectric layer 30 is made of a transparent material having elasticity and insulating properties. For example, one of various transparent polymer materials can be used for the dielectric layer 30. More specifically, materials commercially available as OCA (Optical Clear Adhesive), OCR (Optical Clear Resin), or the like can be used. It is desirable that the dielectric layer 30 do not have pyroelectricity.

Although not illustrated, the touch panel 101 may further include a cover layer and OCA to bond the cover layer on the first principal surface 10a of the first substrate 10.

The plurality of drive electrodes 12 and the plurality of floating island electrodes 11 are located on the second principal surface 10b of the first substrate 10. As illustrated in FIG. 4, the plurality of drive electrodes 12 include, for example, a plurality of rhombic bases 12c arranged in a matrix in the row direction (the x-axis direction) and the column direction (the y-axis direction) and a plurality of connecting portions 12d each for connecting the bases 12c to each other in the row direction and the column direction. The connecting portion 12d is cut by a slit 12e in the column direction. Therefore, in every adjacent two of the drive electrodes 12, the bases 12c are connected only in the row direction. The plurality of drive electrodes 12 each extending in the row direction are arranged in the column direction.

Each of the plurality of floating island electrodes 11 has, for example, an octagonal shape obtained by truncating four vertices of a rhombus and is disposed in one of a plurality of void spaces formed by the drive electrodes 12. That is, the plurality of floating island electrodes 11 are independent rhombic electrodes that are not connected to one another.

On the second principal surface 20b of the first substrate 10, each of the bases 12c of the drive electrodes 12 is surrounded by four adjacent floating island electrodes 11, and each of the floating island electrodes 11 is surrounded by the four adjacent bases 12c of the drive electrodes 12.

The plurality of position detection electrodes 21, the plurality of pressure detection electrodes 22, and the plurality of heat detection electrodes 23 are located on the first principal surface 20a of the second substrate 20. As illustrated in FIG. 5, the plurality of position detection electrodes 21 include a plurality of rhombic bases 21c arranged, for example, in a matrix in the row direction and the column direction and a plurality of connecting portions 21d each connecting adjacent two of the bases 21c to each other in the column direction. In each of the bases 21c, two vertices located on a diagonal line extending in the row direction are truncated.

The plurality of pressure detection electrodes 22 include a plurality of bases 22c arranged, for example, in a matrix in the row direction and the column direction and a plurality of connecting portions 22d each connecting adjacent two of the bases 22c to each other in the row direction. One of the heat detection electrodes 23 is located adjacent to one of the pressure detection electrodes 22 extending in the column direction. Each of the heat detection electrodes 23 includes bases 23c and a connecting portion 23d that connects adjacent two of the bases 23c to each other. The heat detection electrode 23 has a zigzag strip shape, viewed as a whole. One pressure detection electrode 22 and one heat detection electrode 23 integrally have a shape so as to shift one of the position detection electrodes 21 by half a pitch in the row direction and the column direction.

One of the heat detection electrodes 23 is adjacent to one of the position detection electrodes 21 on one side and one of the pressure detection electrodes 22 on the other side in the row direction. That is, the position detection electrode 21 is sandwiched between the heat detection electrode 23 and the pressure detection electrode 22 in the row direction. The plurality of position detection electrodes 21, the plurality of pressure detection electrodes 22, and the plurality of heat detection electrodes 23 each extend in the column direction and are arranged in the row direction.

Figure 6:
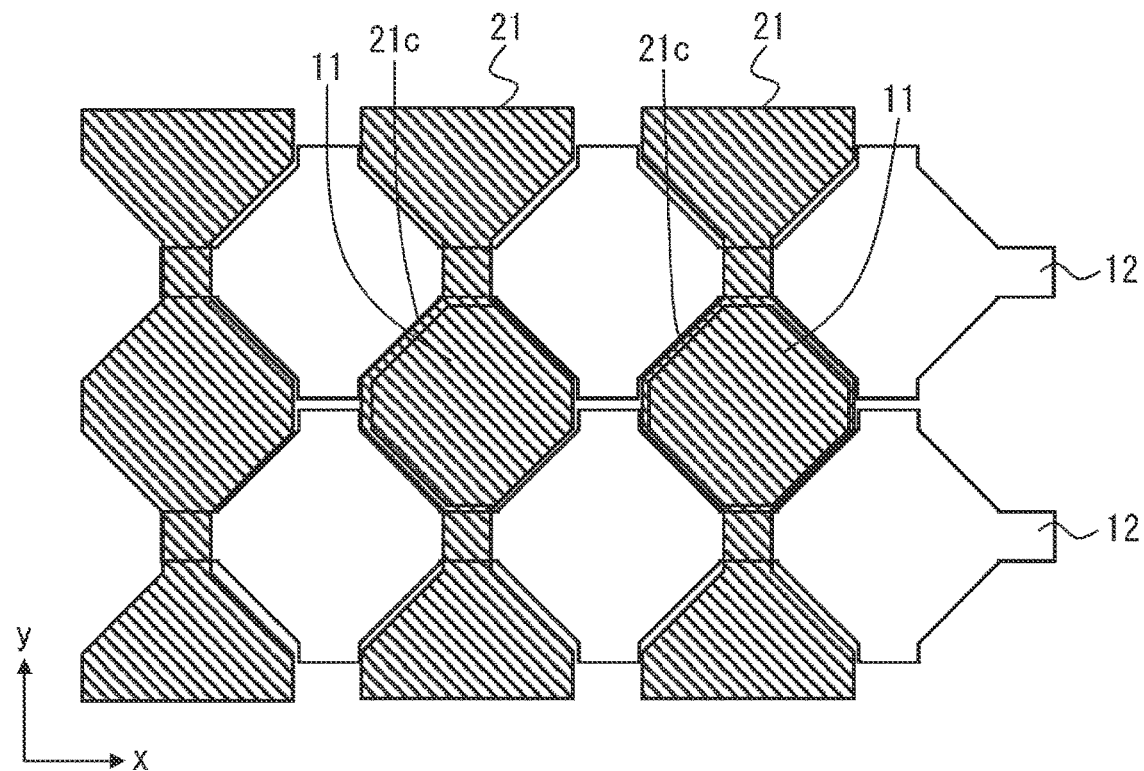
FIG. 6 is a plan view illustrating overlapping of each of a floating island electrode and a drive electrode and a position detection electrode in plan view.
Figure 7:
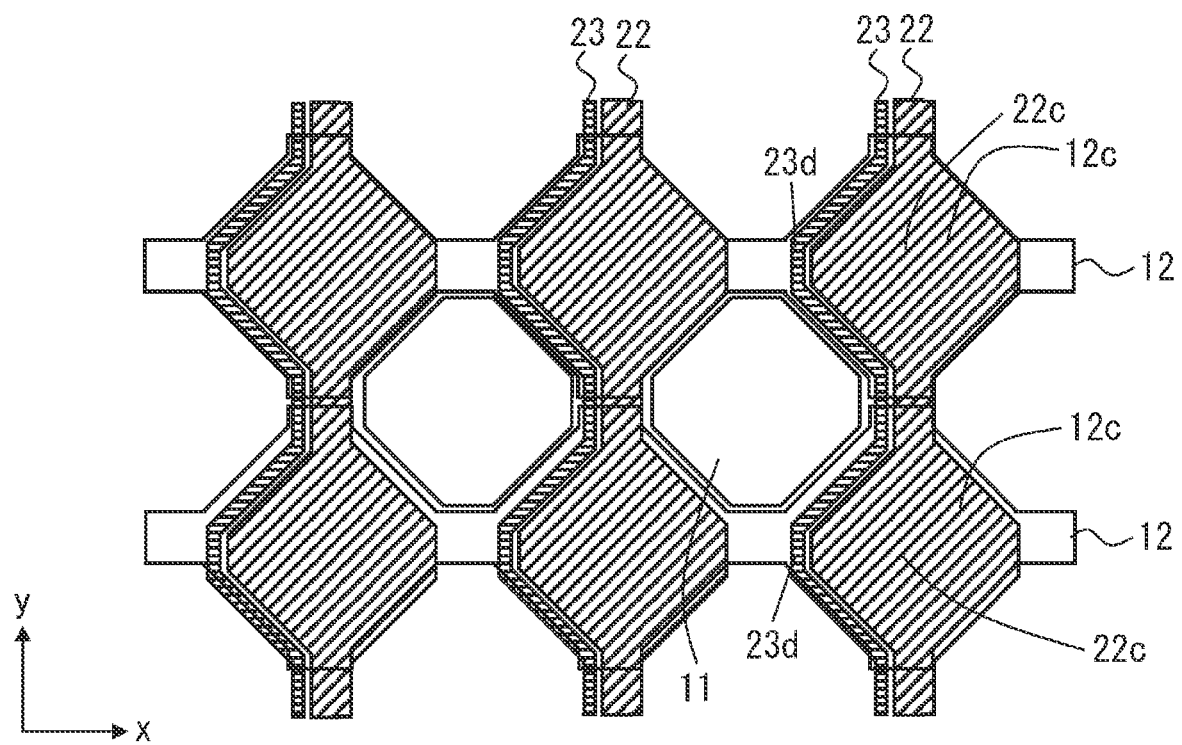
FIG. 7 is a plan view illustrating overlapping of each of the floating island electrode and the drive electrode and each of a pressure detection electrode and a heat detection electrode in plan view.

FIGS. 6 and 7 illustrate how the floating island electrode 11 and the drive electrode 12 located on the first substrate 10 overlap the position detection electrode 21, the pressure detection electrode 22, and the heat detection electrode 23 located on the second substrate 20 in plan view. As used herein, the term "plan view" refers to the view of these electrodes seen from a direction perpendicular to the first principal surface 10a of the first substrate 10.

In FIGS. 6 and 7, for ease of understanding, the floating island electrodes 11 and the drive electrodes 12 are not hatched and are illustrated in white. FIG. 6 does not illustrate the pressure detection electrode 22 and the heat detection electrode 23, and FIG. 7 does not illustrate the position detection electrode 21.

As illustrated in FIG. 6, each of the floating island electrodes 11 overlaps at least part of the position detection electrode 21. More specifically, each of the floating island electrodes 11 almost overlaps the base 21c of the position detection electrode 21. In addition, as illustrated in FIG. 7, the drive electrode 12 overlaps at least part of the heat detection electrode 23 and at least part of the pressure detection electrode 22. More specifically, the base 12c of the drive electrode 12 overlaps the base 23c of the heat detection electrode 23 and the base 22c of the pressure detection electrode 22. It is desirable that the area of the heat detection electrode 23 that overlaps the drive electrode 12 be less than the area of the pressure detection electrode 22 that overlaps the drive electrode 12. If the overlapping area of the pressure detection electrode 22 is large, the level of pressure applied by the pointer can be detected more accurately.

Configuration of Controller

Figure 8:
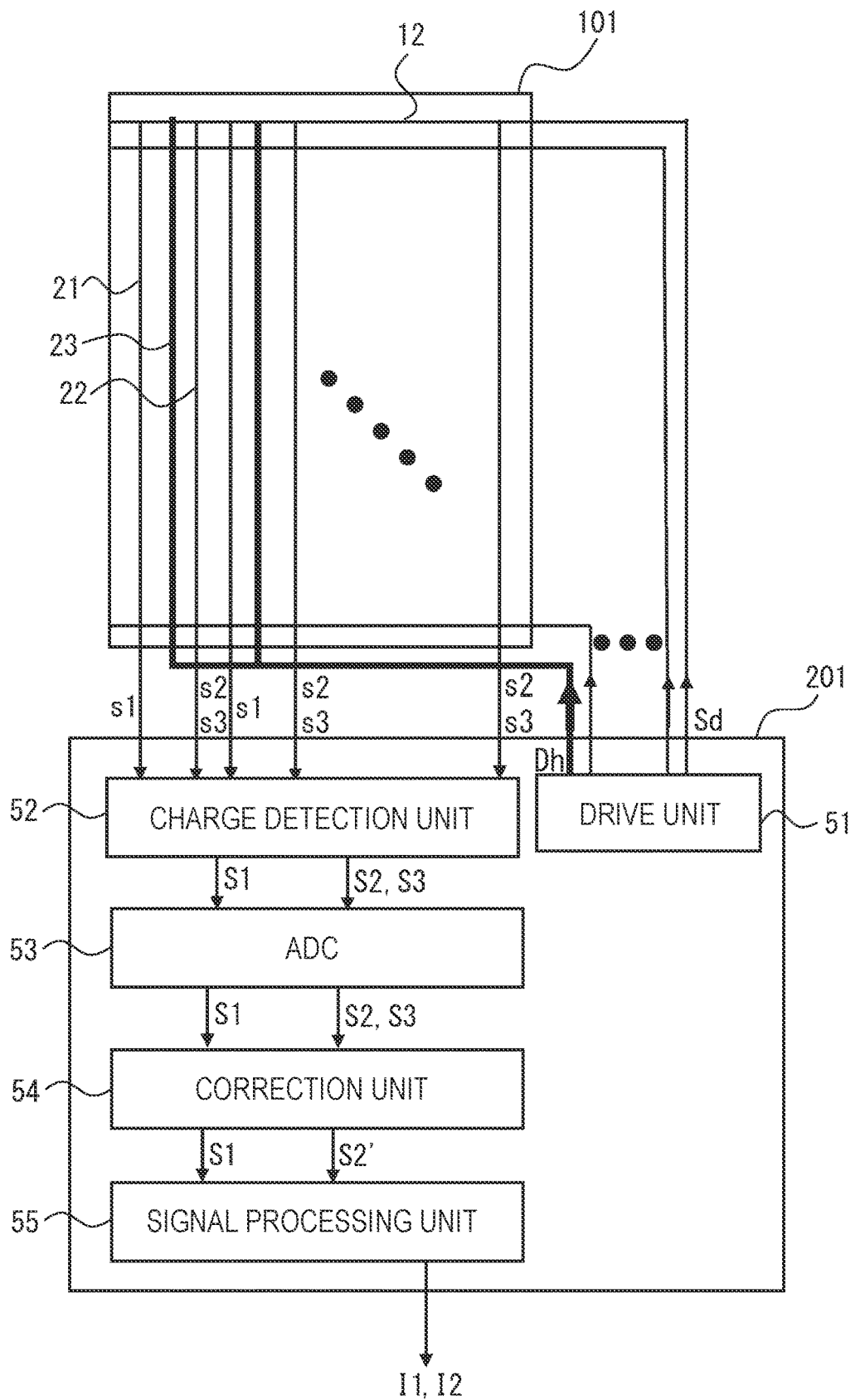
FIG. 8 is a block diagram of an example of a controller in the touch panel system according to the first embodiment.

FIG. 8 is a block diagram of an example of the controller 201. The controller 201 includes a drive unit 51, a charge detection unit 52, an analog to digital converter (ADC) 53, and a signal processing unit 55. The signal processing unit 55 includes a correction unit 54.

Figure 17:
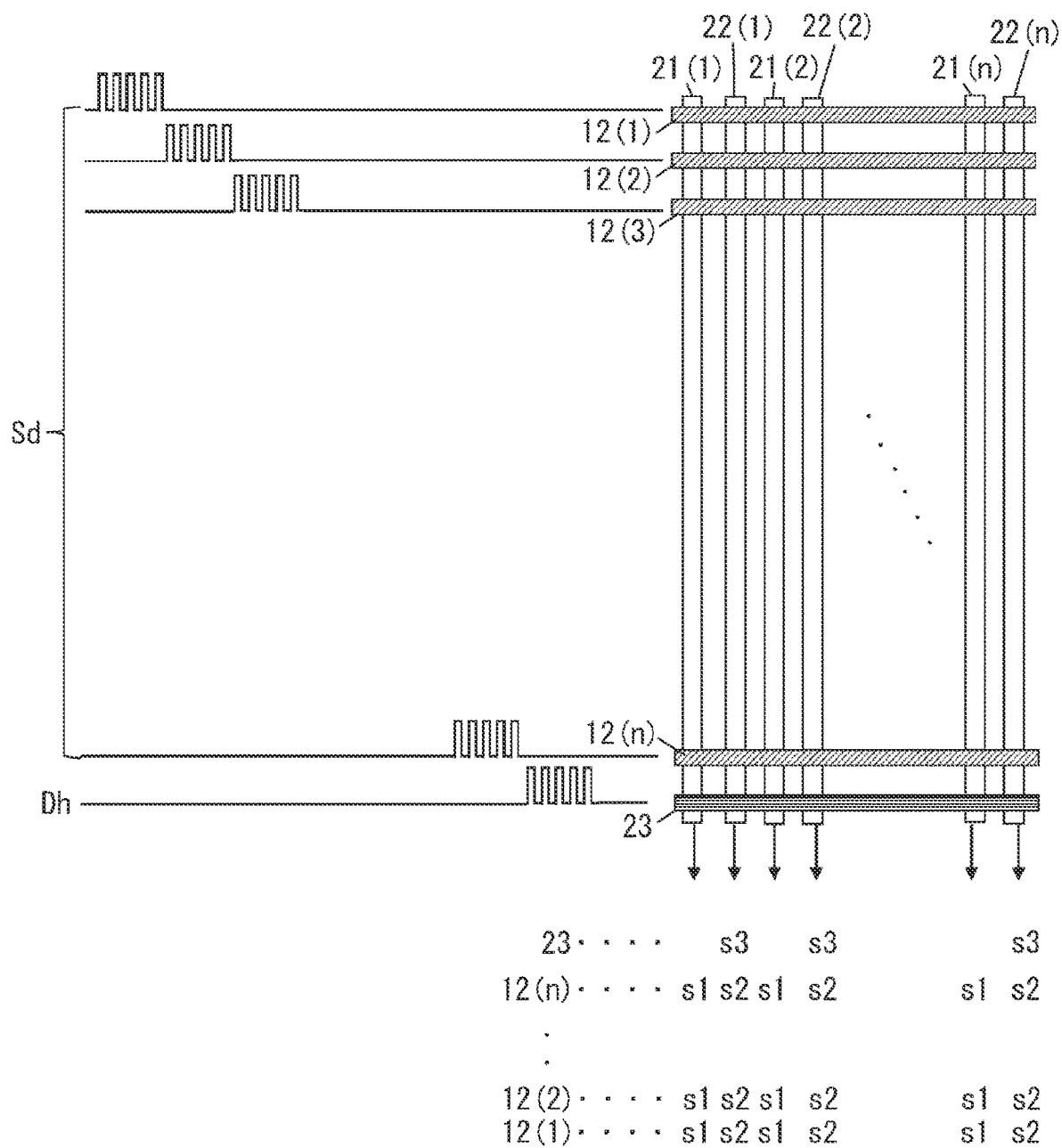
FIG. 17 is a schematic illustration of the timing of a drive signal Sd and a drive signal Dh and the timing when signals s1, s2, and s3 are obtained.

The drive unit 51 includes a function generator and the like. The drive unit 51 generates the drive signal Sd and the drive signal Dh. The drive unit 51 applies the drive signal Sd to the plurality of drive electrodes 12 and applies the drive signal Dh to the plurality of heat detection electrodes 23. FIG. 17 is a schematic illustration of the timing when the drive signal Sd and the drive signal Dh are applied and the timing when the signals s1, s2, and s3 are obtained. The drive signal Sd is sequentially applied to the plurality of drive electrodes 12. Let 12(1), 12(2), . . . 12(n) denote the plurality of drive electrodes 12 arranged in the column direction, let 21(1), 21(2), . . . 21(n) denote the plurality of position detection electrodes arranged in the row direction, and let 22(1), 22(2), . . . 22(n) denote the plurality of pressure detection electrodes arranged in the row direction. Then, the drive signal Sd is applied to the first drive electrode 12(1), and the position detection electrodes 21(1), 21(2), . . . 21(n) and the pressure detection electrodes 22(1), 22(2), . . . 22(n) that intersect the first drive electrode 12(1) output signals s1 and signals s2, respectively.

After the drive electrodes are sequentially scanned and the drive signal Sd is applied to the drive electrodes 12(n), the drive signal Dh is applied to all the heat detection electrodes 23 at the same time, and the pressure detection electrodes 22(1) to 22(n) output the signals s3 at the same time. In FIG. 17, the heat detection electrode 23 intersects with the position detection electrodes 21 and the pressure detection electrodes 22. However, the heat detection electrode 23 does not intersect with these electrodes.

After scanning and driving the plurality of drive electrodes 12 in turn in this manner, the drive unit 51 drives the plurality of heat detection electrodes 23 at the same time. The drive unit 51 repeats the scanning operation as the operations for one frame.

The timing when the signal s3 is obtained is not simultaneous with the timing when the signal s2 is obtained. However, the time is within one frame, and the position detection in the touch panel is performed for each frame. For this reason, it is considered that the time difference is sufficiently allowable. When a controller capable of parallel driving is used, the drive signal Sd and the drive signal Dh can be applied to the drive electrode 12 and the heat detection electrode 23, respectively, at the same time, and the signal s2 and the signal s3 can be obtained at the same time.

The charge detection unit 52 receives the signal s1 output from each of the position detection electrodes 21, the detection signal s2 output from each of the pressure detection electrodes 22, and the heat signal s3 output from each of the pressure detection electrodes 22 in response to the drive signal Dh input to the heat detection electrode 23. The signals s1, s2, and s3 contain information about a change in capacitance due to the touch or heat of the pointer. The charge detection unit 52 converts the signals s1, s2, and s3 into voltage values proportional to the values of the capacitance or the changes in capacitance and outputs a position detection signal S1, a pressure detection signal S2, and the heat detection signal S3. That is, the charge detection unit 52 detects the signal s1 output from each of the position detection electrodes 21 and the signals s2 and s3 output from each of the pressure detection electrodes 22 and outputs the position detection signal S1, the pressure detection signal S2, and the heat detection signal S3. The position detection signal S1, the pressure detection signal S2, and the heat detection signal S3 are obtained from the position detection electrode 21, the pressure detection electrode 22, and the heat detection electrode 23, respectively, by the charge detection unit 52. The charge detection unit 52 can be configured by, for example, a detection circuit such as a widely used integration circuit including an operational amplifier.

The ADC 53 includes, for example, a sample-and-hold circuit and an A/D converter. The ADC 53 receives the position detection signal S1 and a corrected pressure detection signal S2', converts the signals S1 and S2' into digital signals, and outputs the signals S1 and S2' to the signal processing unit 55.

The correction unit 54 corrects the pressure detection signal S2 obtained from each of the pressure detection electrodes 22 on the basis of the heat detection signal S3 obtained from the heat detection electrode 23 adjacent to the pressure detection electrode 22 and generates the corrected pressure detection signal S2'. As described in detail below, the relative permittivity of the dielectric layer 30 depends on the temperature. For this reason, when the touch panel 101 is affected by heat, a change in the relative permittivity of the dielectric layer 30 may affect the change in capacitance to be detected. Although in Japanese Unexamined Patent Application Publication No. 2015-75892, the heat due to approach of the pointer is detected by using the pyroelectric effect, heat other than the heat of the pointer may affect the operation performed by the touch panel depending on the use environment of the touch panel, as described above.

For this reason, according to the touch panel system of the present embodiment, a change in capacitance due to heat is detected by the heat detection electrode 23, and an influence of a change in capacitance due to heat on the pressure detection signal S2 is reduced by using the detected heat detection signal S3. For example, the corrected pressure detection signal S2' is generated by amplifying the heat detection signal S3 and subtracting the amplified position detection signal S3 from the pressure detection signal S2. The correction unit 54 may be configured as part of the signal processing unit 55 or may be configured using a memory and an arithmetic circuit.

The signal processing unit 55 includes a microcomputer and a memory. The signal processing unit 55 receives the position detection signal S1 and the corrected pressure detection signal S2' and generates a two-dimensional map regarding the position of the pointer and the pressure level applied by the pointer. The generated two-dimensional map corresponds to the first principal surface 10a of the first substrate 10 of the touch panel. More specifically, the position detection map is generated from the position detection signals S1, and the pressure detection map is generated from the corrected pressure detection signals S2'. The signal processing unit 55 outputs the maps as the position information I1 and the pressure information I2.

In addition, the signal processing unit 55 controls the drive unit 51, the charge detection unit 52, the ADC 53, and the correction unit 54.

Operation Performed by Touch Panel

Figure 9A:
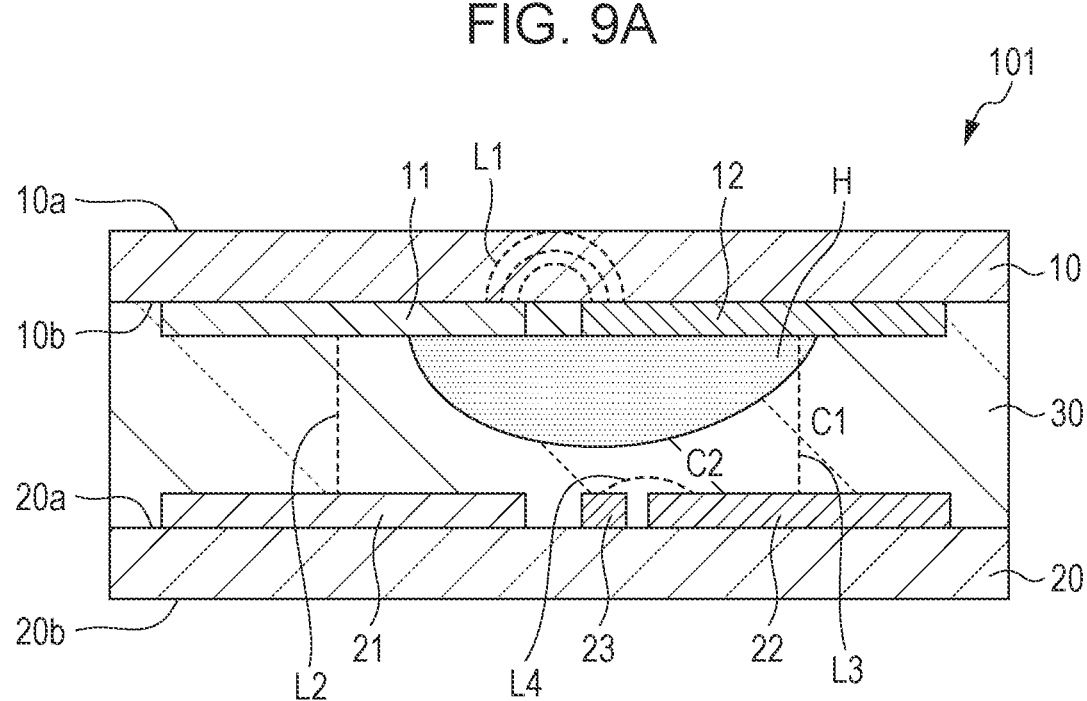
FIG. 9A is a schematic illustration of the lines of electric force corresponding to capacitive coupling that occurs between a pointer and a variety of electrodes.
Figure 9B:
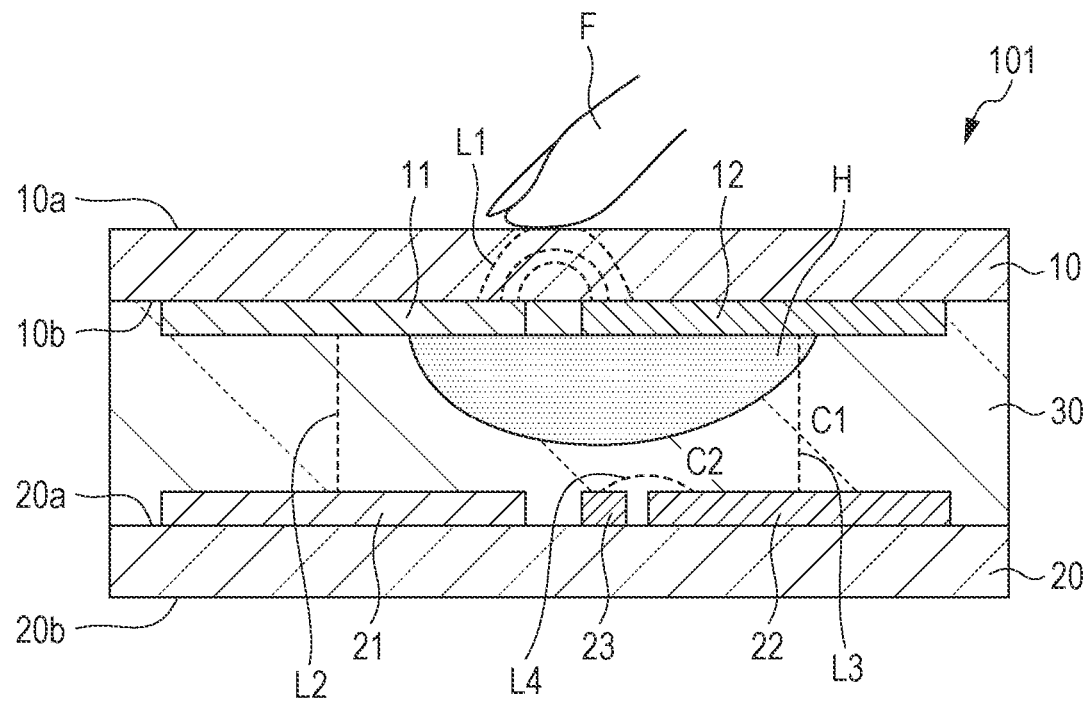
FIG. 9B is a schematic illustration of the lines of electric force corresponding to capacitive coupling that occurs between the pointer and a variety of electrodes.

The operation performed by the touch panel system 301 is described below with reference to FIGS. 9A and 9B. In FIGS. 9A and 9B, broken lines L1, L2, L3, and L4 denote the lines of electric force corresponding to capacitive coupling that occurs between a pointer F and a variety of electrodes and capacitive coupling that occurs between the variety of electrodes. When a pointer is not present, the lines of electric force illustrated in FIG. 9A are generated. In contrast, if the pointer F touches the first principal surface 10a of the first substrate 10, some of the lines of electric force indicated by the broken lines L1 are coupled with the pointer F, as illustrated in FIG. 9B. Therefore, the coupling capacitance between the drive electrode 12 and the floating island electrode 11 reduces as compared with the coupling capacitance indicated by the broken lines L1 when the pointer is not present. At this time, since as indicated by the broken line L2, the floating island electrode 11 is capacitively coupled with the position detection electrode 21, the drive electrode 12 is capacitively coupled with the position detection electrode 21 via the floating island electrode 11. For this reason, the capacitance between the drive electrode 12 and the position detection electrode 21 is reduced via the pointer F, and the signal s1 obtained from the position detection electrode 21, that is, the position detection signal S1 is changed.

Furthermore, as indicated by the broken line L3 in FIGS. 9A and 9B, the drive electrode 12 and the pressure detection electrode 22 are capacitively coupled by a capacitance C1. At this time, if the first substrate 10 is pressed by the pointer F, the distance between the drive electrode 12 and the pressure detection electrode 22 is reduced at the pressed portion, since the dielectric layer 30 is made of an elastic material. As a result, the capacitance between the drive electrode 12 and the pressure detection electrode 22 increases, and the signal s2 obtained from the pressure detection electrode 22 and the pressure detection signal S2 change.

As indicated by the broken line L4, the heat detection electrode 23 is capacitively coupled with, primarily, the closest pressure detection electrode 22 by a capacitance C2. Therefore, the drive electrode 12 and the heat detection electrode 23 are capacitively coupled via the pressure detection electrode 22. Since the capacitance C1 and the capacitance C2 are connected in series, a combined capacitance C is given by $C=(C1 \cdot C2)/(C1+C2)$. If the capacitance C2 is sufficiently less than the capacitance C1, for example, if $C2=0.1 \cdot C1$, then $C=1/11 \cdot C1$. As the capacitance difference between C1 and C2 increases, a signal obtained from the heat detection electrode 23 is less susceptible to a change in the capacitance C1. That is, even when the first substrate 10 is pressed by the pointer F, the heat detection signal S3 is less susceptible to a change in the capacitance due to the pressing.

The influence of heat is described below. When the pointer F, which is a finger, touches the first principal surface 10a of the first substrate 10 and if the ambient temperature around the touch panel 101 is low, heat is transferred from the pointer F to the dielectric layer 30, as indicated by hatching H illustrated in FIG. 9B. As a result, the temperature of the dielectric layer 30 increases. When the dielectric is a polymeric material, the relative permittivity of the dielectric generally increases with increasing temperature.

Figure 10:
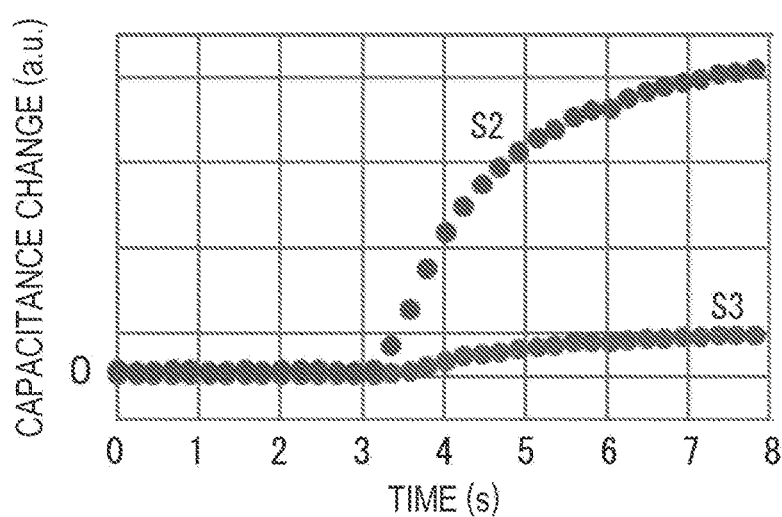
FIG. 10 illustrates an example of measurement results of signals indicating changes in capacitance detected by the pressure detection electrode and the heat detection electrode when the touch panel is touched by the pointer.

FIG. 10 illustrates examples of the pressure detection signal S2 detected by the pressure detection electrode 22 and the heat detection signal S3 detected by the heat detection electrode 23. These signals indicate changes in capacitance on the touch panel 101 detected by the pressure detection electrode 22 and the heat detection electrode 23. The abscissa indicates the time, and the ordinate indicates the capacitance change with respect to the time when the pointer F touches the first principal surface 10a of the first substrate 10. The units of the ordinate are any units.

The pressure detection signal S2 remains almost unchanged for three seconds after touch of the pointer F. However, after three seconds, the pressure detection signal S2 increases. This indicates that after three seconds, the heat of the finger (the pointer F) that has touched the first principal surface 10a of the first substrate 10 is transferred to the dielectric layer 30, causing the temperature to increase and, thus, the relative permittivity of the dielectric layer 30 between the drive electrode 12 and the pressure detection electrode 22 begins to increase, resulting in an increase in the capacitance C1. As described above, if the temperature of the dielectric layer 30 increases, the capacitance changes although the pointer F does not press the first substrate 10, and the pressure detection signal S2 obtained from the pressure detection electrode 22 changes.

In contrast, the heat detection signal S3 obtained from the heat detection electrode 23 depends on the combined capacitance C of the series-connected capacitances C1 and C2. The effect of the above-described increase in relative permittivity of the dielectric layer 30 affects the relative permittivity of the capacitance C2 formed by the heat detection electrode 23 and the pressure detection electrode 22 in contact with the dielectric layer 30. However, since the heat detection electrode 23 and the pressure detection electrodes 22 do not face each other, the influence of the change in the relative permittivity of the dielectric layer 30 is smaller than the influence of the change in the capacitance C1. In addition, the combined capacitance C is substantially dominated by the capacitance C2. As a result, as illustrated in FIG. 10, the change in the heat detection signal S3 is less than the change in the pressure detection signal S2.

As can be seen from FIG. 10, the heat detection signal S3 and the pressure detection signal S2 change at almost the same time and exhibit similar tendencies. This is because both the heat detection signal S3 and the pressure detection signal S2 are influenced by a change in relative permittivity of the dielectric layer 30 at almost the same time, although the magnitudes of the influences are different. Therefore, by adjusting the amplitudes of the heat detection signal S3 and the pressure detection signal S2 so that the influences of the changes in relative permittivity of the dielectric layer 30 are substantially the same, the influence of the change in capacitance due to heat on the pressure detection signal S2 can be reduced by using the heat detection signal S3.

Figure 11:
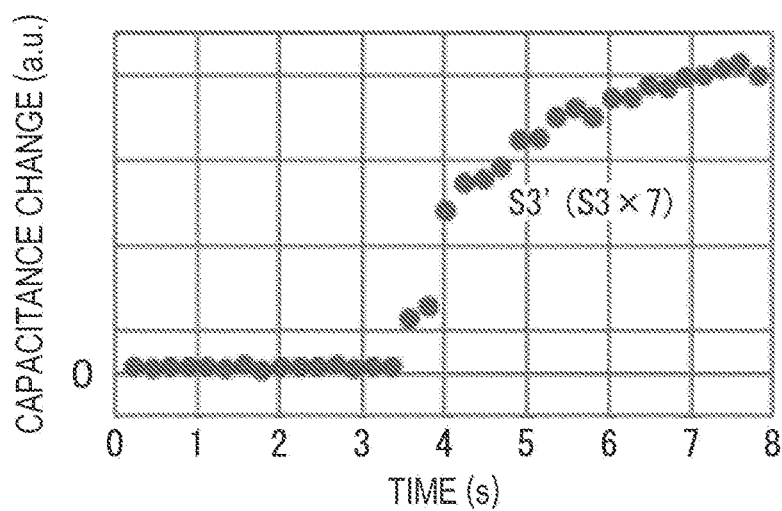
FIG. 11 illustrates the result of amplifying a signal that is detected by the heat detection electrode and that is illustrated in FIG. 10.
Figure 12:
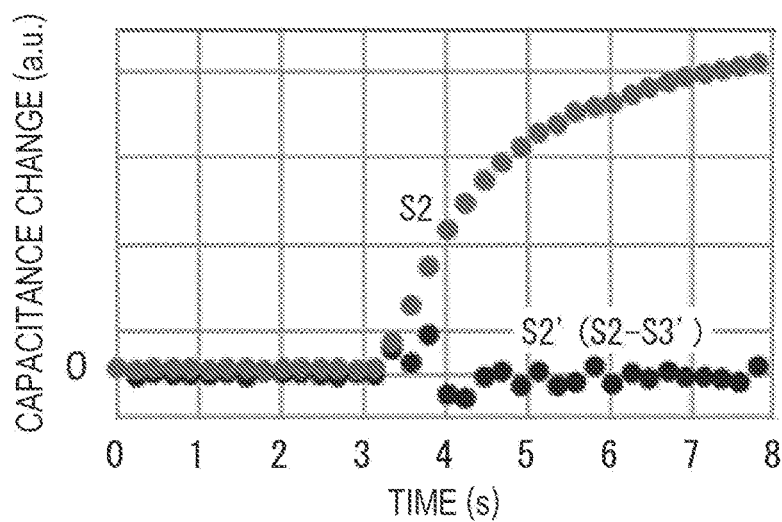
FIG. 12 illustrates a signal obtained by subtracting the amplified signal illustrated in FIG. 11 from the signal detected by the pressure detection electrode illustrated in FIG. 10.

FIG. 11 illustrates an amplified heat detection signal S3' obtained by amplifying the heat detection signal S3 by seven times. The amplified heat detection signal S3' illustrated in FIG. 11 is almost the same as the pressure detection signal S2 illustrated in FIG. 10. FIG. 12 illustrates the pressure detection signal S2 and a corrected pressure detection signal S2' obtained by subtracting the amplified heat detection signal S3' from the pressure detection signal S2. As illustrated in FIG. 12, after three seconds, an increase in capacitance due to heat is reduced and is substantially zero. From this, it can be seen that the influence of heat can be reduced by providing the heat detection electrode 23 in the touch panel 101 and correcting the pressure detection signal by using the signal obtained from the heat detection electrode 23. The amplification ratio, that is, the amplification factor of the heat detection signal can be determined so that the influence of heat is minimized. If the detection of the level of touch by the pointer is canceled out by performing the correction, the amplification factor may be set small so as to maintain the sufficient detection sensitivity. The amplification factor of the heat detection signal depends on the ratio of the area of the heat detection electrode 23 to the area of the pressure detection electrode 22, the position of the heat detection electrode 23, and the like. Therefore, the amplification factor can be appropriately determined on the basis of simulation, actual measurement, or the like.

As described above, according to the touch panel system of the present embodiment, it is possible to detect both the position of the pointer F and the level of the pressure applied by the pointer F through a capacitive method not using a pyroelectric body. Moreover, when the temperature difference between a pointer and a touch panel is large, the influence of the temperature of the pointer on the detection of pressure can be reduced.

Furthermore, according to the touch panel system of the present embodiment, since the pressure detection signal S2 is corrected by using the heat detection signal S3 detected at the same time, it is possible to appropriately correct a rapid influence of heat (noise). For example, Japanese Unexamined Patent Application Publication No. 2012-43394 describes that in an in-cell touch panel, a moving average of touch panel detection signals obtained periodically is calculated to reduce noise due to a display drive signal. When such a noise reduction method is used to reduce the influence of a change in electric permittivity due to heat, it is difficult to accurately reduce the influence of heat because rapid changes in the relative permittivity are averaged over time. In addition, by averaging, a change in the change in electric permittivity has an influence for a long period of time. From this point of view, the touch panel system according to the present embodiment can reduce the influence of heat of a finger and the environment more effectively.

Second Embodiment

Figure 13:
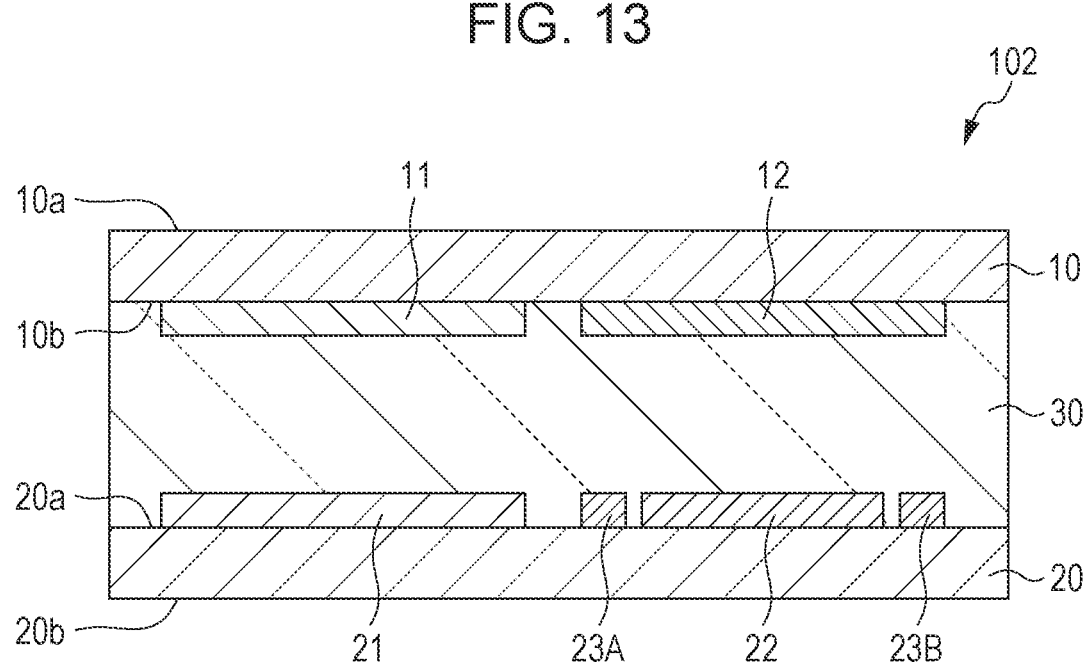
FIG. 13 is a schematic illustration of an enlarged cross-sectional structure of a touch panel according to a second embodiment.
Figure 14:
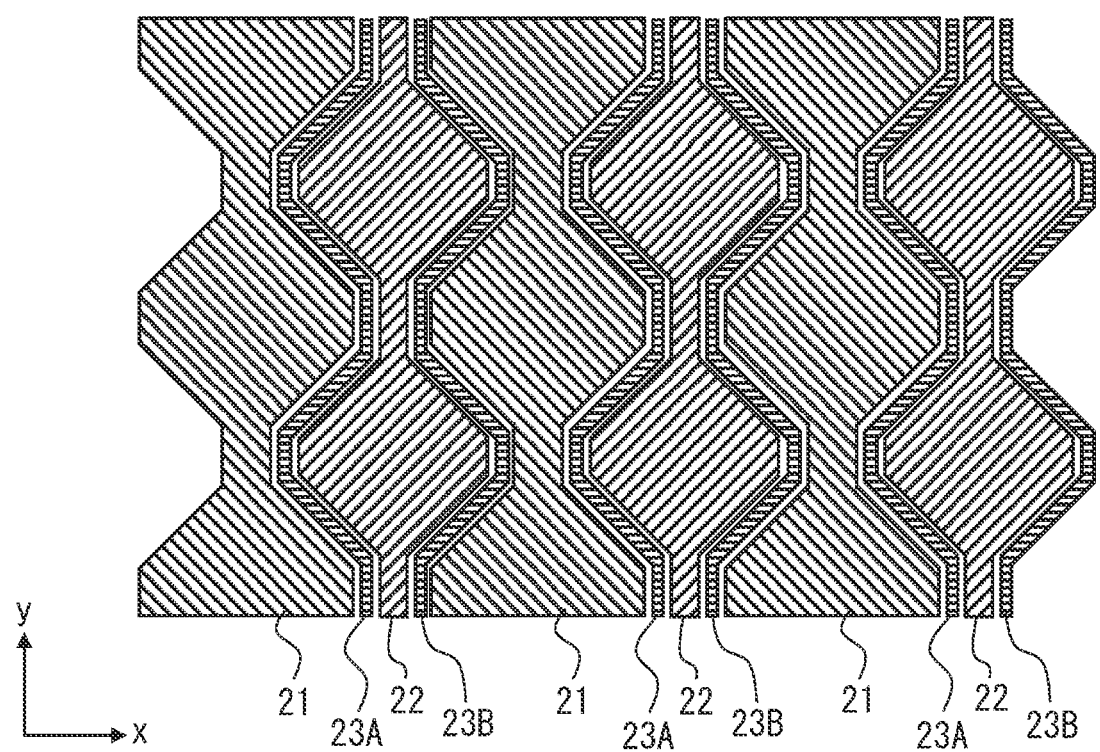
FIG. 14 is a plan view of the structure of the electrodes included in the touch panel illustrated in FIG. 13.

FIG. 13 is an enlarged cross-sectional view of a touch panel of a touch panel system according to the second embodiment. FIG. 14 is a plan view of a position detection electrode, a pressure detection electrode, and a heat detection electrode located on the second substrate 20. A touch panel 102 of the touch panel system according to the present embodiment differs from the touch panel 101 according to the first embodiment in terms of the structures of the position detection electrode, the pressure detection electrode, and the heat detection electrode.

More specifically, the touch panel 102 includes, as heat detection electrodes 23, first sub-heat detection electrodes 23A and second sub-heat detection electrodes 23B. In plan view, the pressure detection electrode 22 is located between the first sub-heat detection electrode 23A and the second sub-heat detection electrode 23B. In addition, the drive electrode 12 overlaps at least part of the first sub-heat detection electrode 23A, at least part of the second sub-heat detection electrode 23B, and at least part of the pressure detection electrode 22.

It is desirable that the sum of the area of the first sub-heat detection electrode 23A and the area of the second sub-heat detection electrode 23B that overlap the drive electrode 12 be less than the area of the pressure detection electrode 22 that overlaps the drive electrode 12.

A drive signal Dh is simultaneously input to the first sub-heat detection electrode 23A and the second sub-heat detection electrode 23B that sandwich one of the pressure detection electrodes 22, a heat signal s3 is output from each of the pressure detection electrodes 22, and the charge detection unit 52 generates a heat detection signal S3. Since the heat detection signal S3 is based on changes in the electric field generated on both sides of the pressure detection electrode 22, the heat detection signal S3 is more affected by changes in electric permittivity caused by temperature changes in the dielectric layer 30. Therefore, a change in amplitude of the heat detection signal S3 due to the change in capacitance is greater than that of the heat detection signal S3 obtained in the first embodiment.

Like the first embodiment, the correction unit 54 amplifies the heat detection signal S3 and subtracts an amplified heat detection signal S3' from the pressure detection signal S2 so as to generate a corrected pressure detection signal S2'. At this time, since, as described above, the change in capacitance in the heat detection signal S3 is greater than in the first embodiment, the amplification factor can be made less than in the first embodiment.

According to the touch panel and the touch panel system of the present embodiment, since the heat detection signal S3 is obtained by a drive voltage applied to the two heat detection electrodes, the amplification factor of the heat detection signal can be reduced. Therefore, the accuracy of correction can be improved and, thus, the influence of heat on the pressure detection signal can be reduced. Furthermore, since the first sub-heat detection electrode 23A and the second sub-heat detection electrode 23B can be disposed on either side of the pressure detection electrode 22 in the row direction, the heat detection accuracy in the row direction can be improved. As a result, the pressure detection signal can be corrected more accurately.

Third Embodiment

Figure 15:
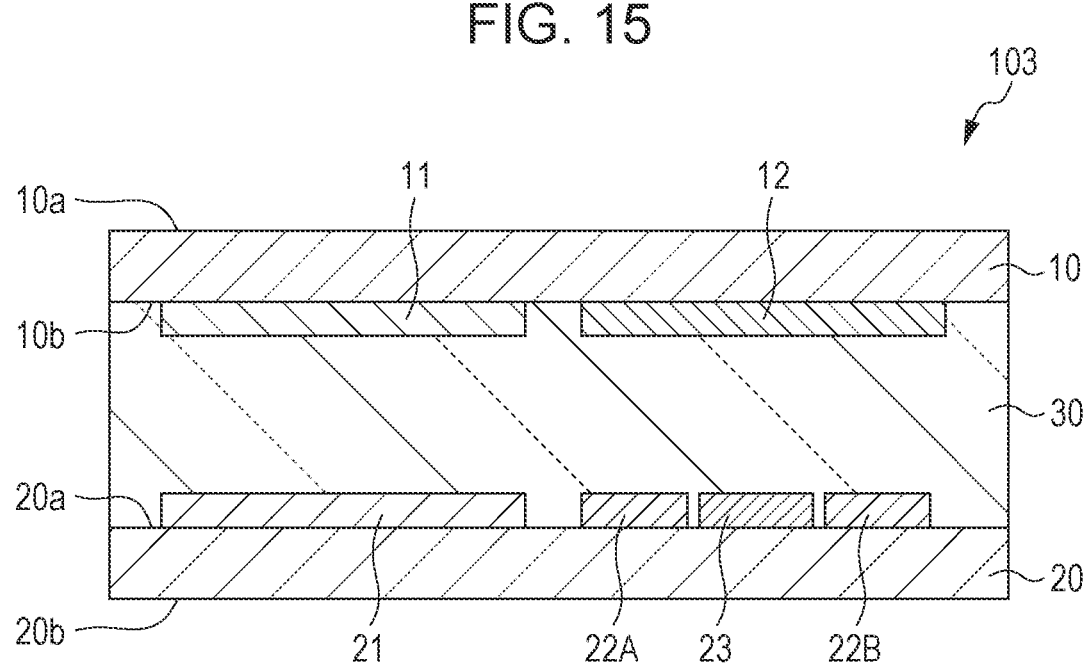
FIG. 15 is a schematic illustration of an enlarged cross-sectional structure of a touch panel according to a third embodiment.
Figure 16:
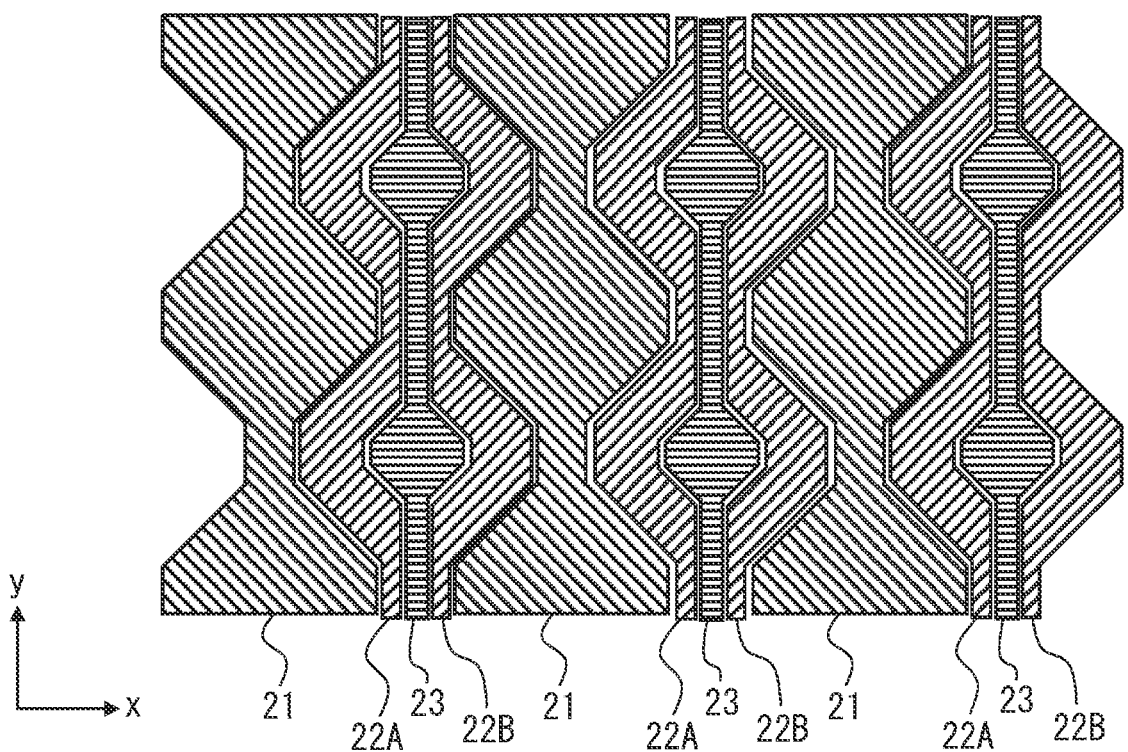
FIG. 16 is a plan view of the structure of the electrodes included in the touch panel illustrated in FIG. 15.

FIG. 15 is an enlarged cross-sectional view of a touch panel of a touch panel system according to the third embodiment. FIG. 16 is a plan view of a position detection electrode, a pressure detection electrode, and a heat detection electrode located on the second substrate 20. A touch panel 103 of the touch panel system according to the present embodiment differs from the touch panel 101 according to the first embodiment in terms of the structures of the position detection electrode, the pressure detection electrode, and the heat detection electrode.

More specifically, the touch panel 103 includes, as the pressure detection electrodes 22, first sub-pressure detection electrodes 22A and second sub-pressure detection electrodes 22B. In plan view, the heat detection electrode 23 is located between the first sub-pressure detection electrode 22A and the second sub-pressure detection electrode 22B. In addition, the drive electrode 12 overlaps at least part of the first sub-pressure detection electrode 22A, at least part of the second sub-pressure detection electrode 22B, and at least part of the heat detection electrode 23.

It is desirable that the sum of the area of the first sub-pressure detection electrode 22A and the area of the second sub-pressure detection electrode 22B that overlap the drive electrode 12 be greater than the area of the heat detection electrode 23 that overlaps the drive electrode 12.

The first sub-pressure detection electrode 22A and the second sub-pressure detection electrode 22B that sandwich one of the heat detection electrodes 23 output signals s2A and s2B, respectively. The charge detection unit 52 generates a pressure detection signal S2A and a pressure detection signal S2B from the signal s2A and the signal s2B, respectively. The generated pressure detection signal S2A and pressure detection signal S2B are summed to form a pressure detection signal S2.

Similarly, when the drive signal Dh is applied to the first sub-pressure detection electrode 22A and the second sub-pressure detection electrode 22B that sandwich one of the heat detection electrodes 23, signals s3A and s3B are output from the first sub-pressure detection electrode 22A and the second sub-pressure detection electrode 22B, respectively. The charge detection unit 52 generates a heat detection signal S3A and a heat detection signal S3B from the signals s3A and s3B, respectively. The generated heat detection signal S3A and heat detection signal S3B are summed to form a heat detection signal S3. The correction unit 54 amplifies the heat detection signal S3 and subtracts an amplified heat detection signal S3' from the pressure detection signal S2 to generate a corrected pressure detection signal S2'.

According to the touch panel and the touch panel system of the present embodiment, the heat detection electrode 23 is sandwiched between the first sub-pressure detection electrode 22A and the second sub-pressure detection electrode 22B in the row direction. Therefore, the heat detection electrode 23 is separated from the floating island electrode 11, and the coupling capacitance between the floating island electrode 11 and the heat detection electrode 23 is reduced. In this way, when the pointer presses the first principal surface 10a of the first substrate 10, a large change in the coupling capacitance between the floating island electrode 11 and the heat detection electrode 23 is reduced. As a result, it is possible to reduce the influence of a change in the pressure level included in the heat detection signal and, thus, the influence of heat on the pressure detection signal can be reduced more accurately by using the heat detection signal.

Other Embodiments

The touch panel, the touch panel system, and a method for controlling a touch panel according to the present disclosure are not limited to the above embodiments, and various modifications can be made. For example, the controller may perform signal processing in a different manner than described in the above-described embodiments.

In addition, according to the above-described embodiments, the position detection signal S1 is directly used to generate the position information I1. However, like the pressure detection signal S2, the position detection signal S1 may be corrected by using the heat detection signal S3.

Furthermore, the shapes of the drive electrode, the floating island electrode, the position detection electrode, the pressure detection electrode, and the heat detection electrode illustrated in the above embodiments are only examples, and these electrodes may have other shapes.

Furthermore, the above embodiments have been described with reference to an example in which the relative permittivity of the dielectric layer increases as a finger approaches the touch panel. However, the touch panel system according to the present disclosure can reduce the influence of heat even when the relative permittivity of the dielectric layer decreases due to approach of a finger, that is, approach of a pointer having a temperature higher than that of the touch panel.

The touch panel, the touch panel system, and the method for controlling a touch panel according to the present disclosure can also be described as follows.

According to a first configuration, a touch panel system includes a capacitive touch panel and a controller configured to control the touch panel. The touch panel includes a first substrate, a second substrate, a dielectric layer located between the first substrate and the second substrate, a plurality of drive electrodes located on the first substrate, a plurality of floating island electrodes located on the first substrate, a plurality of position detection electrodes located on the second substrate, a plurality of pressure detection electrodes located on the second substrate, and a plurality of heat detection electrodes located on the second substrate, where each of the heat detection electrodes is adjacent to one of the pressure detection electrodes. Each of the drive electrodes overlaps at least part of a corresponding one of the heat detection electrodes and at least part of a corresponding one of the pressure detection electrodes, and each of the floating island electrodes overlaps at least part of a corresponding one of the position detection electrodes in plan view. The controller provides a drive signal to the drive electrodes and the heat detection electrodes and corrects a pressure detection signal obtained from each of the pressure detection electrodes by using a heat detection signal obtained from a change in a coupling capacitance between the heat detection electrode adjacent to the pressure detection electrode and the pressure detection electrode.

According to the first configuration, the capacitive touch panel that employs a capacitive method not using a pyroelectric body can detect both the position of the pointer and the level of the pressure applied by the pointer F. In addition, by correcting the pressure detection signal on the basis of the heat detection signal detected by the heat detection electrode, it is possible to achieve a touch panel system capable of reducing the influence of heat due to the use environment and the pointer and operating with high accuracy.

According to a second configuration, in the touch panel system according to the first configuration, the area of the heat detection electrode that overlaps the drive electrode may be less than the area of the pressure detection electrode that overlaps the drive electrode. Since the overlapping area of the pressure detection electrode is greater, the pressure level of the pointer can be more accurately detected.

According to a third configuration, in the touch panel system according to the first or second configuration, the controller may include a drive unit, a charge detection unit, and a correction unit. The drive unit may generate the drive signal. The charge detection unit may generate the position detection signal from each of the position detection electrodes and generate the pressure detection signal and the heat detection signal from each of the pressure detection electrodes. The correction unit may correct the pressure detection signal on the basis of the heat detection signal and generate a corrected pressure detection signal.

According to a fourth configuration, in the touch panel system according to the third configuration, the correction unit may amplify the heat detection signal and subtract the amplified heat detection signal from the pressure detection signal so as to generate the corrected pressure detection signal.

According to a fifth configuration, in the touch panel system according to any one of the first to fourth configurations, the heat detection electrodes may include a plurality of first sub-heat detection electrodes and a plurality of second sub-heat detection electrodes. Each of the pressure detection electrodes may be located between a corresponding first sub-heat detection electrode and a corresponding second sub-heat detection electrode, and each of the drive electrodes may overlap at least part of the first sub-heat detection electrode, at least part of the second sub-heat detection electrode, and at least part of the pressure detection electrode in plan view. Since the heat detection electrode includes the first sub-heat detection electrode and the second sub-heat detection electrode, the area of the heat detection electrode can be increased and, thus, the magnification factor of the heat detection signal can be reduced. This can improve the accuracy of the correction and reduce the influence of heat on the pressure detection signal more.

According to a sixth configuration, in the touch panel system according to any one of the first to fourth configurations, the pressure detection electrodes may include a plurality of first sub-pressure detection electrodes and a plurality of second sub-pressure detection electrodes. Each of the heat detection electrode may be located between a corresponding first sub-pressure detection electrode and a corresponding second sub-pressure detection electrode, and the drive electrode may overlap at least part of the first sub-pressure detection electrode, at least part of the second sub-pressure detection electrode, and at least part of the heat detection electrode in plan view. Since the heat detection electrode is located so as to be sandwiched between the first sub-pressure detection electrode and the second sub-pressure detection electrode in the row direction, the heat detection electrode can be separated from the floating island electrode. This can reduce the capacitive coupling between the floating island electrode and the heat detection electrode and reduce the influence of a change in the pressure level included in the heat detection signal.

According to a seventh configuration, a display device includes the touch panel system according to any one of the first to sixth configurations and a display configured to display an image. According to the display device of the seventh configuration, since the touch panel system has the above-described configuration, the influence of heat due to the temperature of the operating environment of the touch panel or the temperature difference between the operating environment and the pointer can be reduced and, thus, a touch panel system capable of operating with high accuracy can be achieved.

According to an eighth configuration, a method for controlling a touch panel is provided. The touch panel is a capacitive touch panel. The touch panel includes a first substrate, a second substrate, a dielectric layer located between the first substrate and the second substrate, a plurality of drive electrodes located on the first substrate, a plurality of floating island electrodes located on the first substrate, a plurality of position detection electrodes located on the second substrate, a plurality of pressure detection electrodes located on the second substrate, and a plurality of heat detection electrodes located on the second substrate, where each of the heat detection electrodes is adjacent to one of the pressure detection electrodes. Each of the drive electrodes overlaps at least part of a corresponding one of the heat detection electrodes and at least part of a corresponding one of the pressure detection electrodes, and each of the floating island electrodes overlaps at least part of a corresponding one of the position detection electrodes in plan view. The method includes providing a drive signal to the drive electrodes and the heat detection electrodes and correcting a pressure detection signal obtained from each of the pressure detection electrodes by using a heat detection signal obtained from a change in a coupling capacitance between the heat detection electrode adjacent to the pressure detection electrode and the pressure detection electrode. According to the eighth configuration, by correcting the pressure detection signal on the basis of the heat detection signal detected by the heat detection electrode, it is possible to reduce the influence of heat due to the use environment and the pointer, which achieves a touch panel system that can operate with high accuracy.

The touch panel, the touch panel system, and the method for controlling a touch panel according to the present disclosure can be used for touch panels for various applications and be suitably used for smartphones, tablets, automobile dashboards, car navigation systems, and the like.

The present disclosure contains subject matter related to that disclosed in Japanese Priority Patent Application JP 2022-060998 filed in the Japan Patent Office on Mar. 31, 2022, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof

What is claimed is:

1. A touch panel system comprising:
a capacitive touch panel; and
a controller configured to control the capacitive touch panel,
wherein the capacitive touch panel includes a first substrate, a second substrate, a dielectric layer located between the first substrate and the second substrate, a plurality of drive electrodes located on the first substrate, a plurality of floating island electrodes located on the first substrate, a plurality of position detection electrodes located on the second substrate, a plurality of pressure detection electrodes located on the second substrate, and a plurality of heat detection electrodes located on the second substrate, wherein:
each of the plurality of heat detection electrodes is adjacent to one of the plurality of pressure detection electrodes,
each of the plurality of drive electrodes overlaps at least part of a corresponding one of the plurality of heat detection electrodes and at least part of a corresponding one of the plurality of pressure detection electrodes,
each of the plurality of floating island electrodes overlaps at least part of a corresponding one of the plurality of position detection electrodes in a plan view, and
the controller provides a drive signal to the plurality of drive electrodes and the plurality of heat detection electrodes and corrects a pressure detection signal obtained from each of the plurality of pressure detection electrodes by using a heat detection signal obtained from a change in a coupling capacitance between a heat detection electrode adjacent to a pressure detection electrode and the pressure detection electrode.

2. The touch panel system according to claim 1, wherein an area of the heat detection electrode that is overlapped by a drive electrode is less than an area of the pressure detection electrode that is overlapped by the drive electrode.

3. The touch panel system according to claim 1, wherein:
the plurality of heat detection electrodes includes a plurality of first sub-heat detection electrodes and a plurality of second sub-heat detection electrodes,
each of the plurality of pressure detection electrodes is located between a corresponding one of the plurality of first sub-heat detection electrodes and a corresponding one of the plurality of second sub-heat detection electrodes, and each of the plurality of drive electrodes further overlaps at least part of the corresponding one of the plurality of first sub-heat detection electrodes, at least part of the corresponding one of the plurality of second sub-heat detection electrodes, and at least part of the corresponding one of the plurality of pressure detection electrodes in the plan view.

4. The touch panel system according to claim 1, wherein:
the plurality of pressure detection electrodes includes a plurality of first sub-pressure detection electrodes and a plurality of second sub-pressure detection electrodes,
each of the plurality of heat detection electrodes is located between a corresponding one of the plurality of first sub-pressure detection electrodes and a corresponding one of the plurality of second sub-pressure detection electrodes, and
each of the plurality of drive electrodes overlaps at least part of the corresponding one of the plurality of first sub-pressure detection electrodes, at least part of the corresponding one of the plurality of second sub-pressure detection electrodes, and at least part of the corresponding one of the plurality of heat detection electrodes in the plan view.

5. A display device comprising:
the touch panel system according to claim 1; and
a display configured to display an image,
wherein the capacitive touch panel is disposed on a display surface of the display.

6. A method for controlling a touch panel that is a capacitive touch panel, the touch panel including a first substrate, a second substrate, a dielectric layer located between the first substrate and the second substrate, a plurality of drive electrodes located on the first substrate, a plurality of floating island electrodes located on the first substrate, a plurality of position detection electrodes located on the second substrate, a plurality of pressure detection electrodes located on the second substrate, and a plurality of heat detection electrodes located on the second substrate, each of the plurality of heat detection electrodes being adjacent to one of the plurality of pressure detection electrodes, each of the plurality of drive electrodes overlapping at least part of a corresponding one of the plurality of heat detection electrodes and at least part of a corresponding one of the plurality of pressure detection electrodes in a plan view, and each of the plurality of floating island electrodes overlapping at least part of a corresponding one of the plurality of position detection electrodes in the plan view, the method comprising:
providing a drive signal to the plurality of drive electrodes and the plurality of heat detection electrodes; and
correcting a pressure detection signal obtained from each of the plurality of pressure detection electrodes by using a heat detection signal obtained from a change in a coupling capacitance between a heat detection electrode adjacent to a pressure detection electrode and the pressure detection electrode.

* * * * *